(12) United States Patent
Veeraraghavan et al.

(10) Patent No.: US 11,591,447 B2
(45) Date of Patent: *Feb. 28, 2023

(54) EPOXY BASED REINFORCING PATCHES HAVING IMPROVED DAMPING LOSS FACTOR

(71) Applicants: Thanikaivelan Tindivanam Veeraraghavan, Newburgh, IN (US); Ramanathan Lakshminarayan, Newburgh, IN (US); Brandon Allen Willis, Newburgh, IN (US)

(72) Inventors: Thanikaivelan Tindivanam Veeraraghavan, Newburgh, IN (US); Ramanathan Lakshminarayan, Newburgh, IN (US); Brandon Allen Willis, Newburgh, IN (US)

(73) Assignee: Uniseal, Inc., Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,215

(22) Filed: May 24, 2022

(65) Prior Publication Data
US 2022/0389181 A1  Dec. 8, 2022

Related U.S. Application Data

(63) Continuation of application No. 16/180,340, filed on Nov. 5, 2018, now Pat. No. 11,339,262.
(Continued)

(51) Int. Cl.
*C08J 9/00* (2006.01)
*C03C 25/1095* (2018.01)
(Continued)

(52) U.S. Cl.
CPC ......... *C08J 9/0085* (2013.01); *C03C 25/1095* (2013.01); *C03C 25/36* (2013.01);
(Continued)

(58) Field of Classification Search
CPC .. C08J 163/00; C08J 2207/02; C08J 2375/04; C08J 9/0085; C08J 2400/143; C08J 2400/263; C08J 2475/00; C08J 7/21; C08L 75/04; C08G 18/10; C08G 18/285; C08G 2270/00; Y10S 525/903; C09D 175/00; C09D 175/04; C08K 7/14; C03C 25/1095; C03C 25/36; C03C 25/47; C09J 163/08; C09J 175/04; C09J 175/00; C07D 403/14; C07D 413/14; B29B 11/16
USPC ....... 525/523, 524, 525, 526, 528, 903, 107, 525/191; 428/413, 414, 416, 418, 35.7, 428/200, 297.4, 411.1, 113, 299.7, 327, 428/349, 36.2, 36.8, 355 R; 156/330, 156/275.5, 275.7, 307.3, 320; 528/60;
(Continued)

(56) References Cited

U.S. PATENT DOCUMENTS 4,057,657 A  11/1977  Garnett et al.
4,444,818 A  4/1984  Tominaga et al.
(Continued)

*Primary Examiner* — Camie S Thompson
(74) *Attorney, Agent, or Firm* — King & Partners, PLC

(57) ABSTRACT

A reinforcing sheet including one or more layers of a reinforcing material, and a thermosetting adhesive associated with the reinforcing material, wherein the thermosetting adhesive includes a curing agent, and an epoxy-modified dimerized fatty acid combined with an epoxy terminated polyurethane interpenetrating network.

14 Claims, 14 Drawing Sheets

Solvent = DMSO 300 MHz

Related U.S. Application Data

(60) Provisional application No. 62/588,620, filed on Nov. 20, 2017.

(51) Int. Cl.

| | | |
|---|---|---|
| *C03C 25/36* | (2006.01) | |
| *C03C 25/47* | (2018.01) | |
| *C08G 18/00* | (2006.01) | |
| *C09J 7/21* | (2018.01) | |
| *C08J 9/32* | (2006.01) | |
| *C09J 175/04* | (2006.01) | |
| *C09J 163/04* | (2006.01) | |
| *C09J 7/35* | (2018.01) | |
| *C08J 9/04* | (2006.01) | |

(52) U.S. Cl.
CPC ............ *C03C 25/47* (2018.01); *C08G 18/003* (2013.01); *C08J 9/32* (2013.01); *C09J 7/21* (2018.01); *C09J 7/35* (2018.01); *C09J 163/04* (2013.01); *C09J 175/04* (2013.01); *C08G 2270/00* (2013.01); *C08J 9/04* (2013.01); *C08J 2201/038* (2013.01); *C08J 2205/06* (2013.01); *C08J 2205/08* (2013.01); *C08J 2205/10* (2013.01); *C08J 2207/02* (2013.01); *C08J 2375/04* (2013.01); *C09J 2301/412* (2020.08); *C09J 2400/143* (2013.01); *C09J 2400/263* (2013.01); *C09J 2463/00* (2013.01); *C09J 2475/00* (2013.01)

(58) Field of Classification Search
USPC ..... 264/257; 523/400, 427; 442/218, 1, 150, 442/85, 239; 427/208.2, 386, 410
See application file for complete search history.

(56) References Cited

U.S. PATENT DOCUMENTS

| | | |
|---|---|---|
| 4,732,632 A | 3/1988 | Pieslak et al. |
| 4,766,183 A | 8/1988 | Rizk et al. |
| 4,803,105 A | 2/1989 | Kretow et al. |
| 4,803,108 A | 2/1989 | Leuchten et al. |
| 4,842,938 A | 6/1989 | Rizk et al. |
| 4,900,601 A | 2/1990 | Halg et al. |
| 4,929,483 A | 5/1990 | Halg et al. |
| 5,086,088 A | 2/1992 | Kitano et al. |
| 5,092,947 A | 3/1992 | Halg et al. |
| 5,262,232 A | 11/1993 | Wilfong et al. |
| 5,300,336 A | 4/1994 | Wong et al. |
| 5,540,963 A | 7/1996 | Wong |
| 5,709,948 A | 1/1998 | Perez et al. |
| 5,728,633 A | 3/1998 | Jacobs |
| 5,767,187 A | 6/1998 | Lucas |
| 5,891,292 A | 4/1999 | Goodman et al. |
| 6,166,127 A | 12/2000 | Tomko |
| 6,235,361 B1 | 5/2001 | Jacquemet et al. |
| 6,379,762 B1 | 4/2002 | Omichinski |
| 6,586,089 B2 | 7/2003 | Golden |
| 7,429,220 B2 | 9/2008 | Kuntimaddi et al. |
| 7,473,717 B2 | 1/2009 | Muenz et al. |
| 7,572,491 B2 | 8/2009 | Wang et al. |
| 7,736,743 B2 | 6/2010 | Muenz et al. |
| 7,790,288 B2 | 9/2010 | Perez et al. |
| 8,288,447 B2 | 10/2012 | Muenz et al. |
| 8,882,956 B2 | 11/2014 | Weber |
| 9,539,767 B2 | 1/2017 | Butler |
| 11,339,262 B2 * | 5/2022 | Veeraraghavan ....... C03C 25/36 |
| 2002/0009582 A1 | 1/2002 | Golden |
| 2007/0104958 A1 | 5/2007 | Golden |
| 2010/0196705 A1 | 8/2010 | Hood et al. |
| 2011/0195221 A1 | 8/2011 | Moren |
| 2018/0171087 A1 | 6/2018 | Hanley et al. |

* cited by examiner

Solvent = DMSO 300 MHz

Non-Expandable version (No Glass fiber)

| | |
|---|---|
| Material | Non-Expandable version (No Glass fiber) |
| Thickness | 1.95 - 2.05 mm thickness patch. |
| Test | Flexural Strength (N) at RT, Acoustic efficiency, Oberst (SAE J 1637, 3.0 kg/m2, 200Hz, composite loss factor) |
| Substrate | 60E(0.75mm), CRS(0.75mm) & AL 6022(0.9mm thickness) (1"x 6" size panel) |
| Oil | Ferrocote 6130 oil |
| Bake cycle | Low Bake - 171°C/10 min. (Metal temp.)<br>High Bake - 205°C/30 min. (Metal temp.) |

Composite Loss Factor, 3.0kg/m2, 200Hz

| Substrate | Low Bake | High Bake |
|---|---|---|
| CRS | 0.099 | 0.1085 |
| | 0.1002 | 0.1062 |
| | 0.1 | 0.1074 |

Flexural Strength, (N)

| Substrate | Low Bake | High Bake |
|---|---|---|
| | Max. | Max. |
| 60E | 50 | 54 |
| | 51 | 52 |
| | 51 | 53 |
| CRS | 64 | 73 |
| | 65 | 71 |
| | 65 | 72 |
| AL 6022 | 64 | 77 |
| | 59 | 71 |
| | 62 | 74 |

Flexural Strength (N), min. 50N requirment.
Composite Loss Factor, min. 0.1 requirement

Figure 11

Non-Expandable version (with 7544 type Glass fiber)

Material    Non-Expandable version (with 7544 type Glass fiber)

Thickness    1.95 - 2.05 mm patch material thickness alone.

Test    Flexural Strength (N) at RT,
Acoustic efficiency, Oberst (SAE J 1637, 3.0 kg/m2, 200Hz, composite loss factor)

Substrate    60E(0.75mm), CRS(0.75mm) & AL 6022(0.9mm thickness) (1"x 6" size panel)

Oil    Ferrocote 6130 oil

Bake cycle    Low Bake - 171°C/10 min. (Metal temp.)
High Bake - 205°C/30 min. (Metal temp.)

Composite Loss Factor, 3.0kgm2, 200Hz

| Substrate | Low Bake | High Bake |
|---|---|---|
| CRS | 0.1093 | 0.1074 |
|  | 0.109 | 0.1065 |
|  | 0.1092 | 0.107 |

Flexural Strength, (N)

| Substrate | Low Bake | | High Bake | |
|---|---|---|---|---|
|  | at 2mm | Max. | at 2mm | Max. |
| 60E | 26 | 151 | 31 | 165 |
|  | 25 | 152 | 31 | 157 |
|  | 26 | 151 | 31 | 161 |
| CRS | 31 | 178 | 40 | 182 |
|  | 27 | 157 | 35 | 169 |
|  | 29 | 168 | 38 | 176 |
| AL 6022 | 17 | 157 | 20 | 205 |
|  | 17 | 156 | 21 | 209 |
|  | 17 | 157 | 21 | 207 |

Flexural Strength (N), min. 150N requirement.
Composite Loss Factor, min. 0.1 requirement

Figure 12

Low Expandable version (with 7628 type Glass fiber)

Material Low Expandable version (with 7628 type Glass fiber): 90-120 % Expansion range

Thickness 1.95 - 2.05 mm patch material thickness alone.

Test Flexural Strength (N) at RT,
Acoustic efficiency, Oberst (SAE J 1637, 3.0 kg/m2, 200Hz, composite loss factor)

Substrate 60E(0.75mm), CRS(0.75mm) & AL 6022(0.9mm thickness) (1"x 6" size panel)

Oil Ferrocote 6130 oil

Bake cycle Low Bake - 171°C/10 min. (Metal temp.)
High Bake - 205°C/30 min. (Metal temp.)

| Substrate | Composite Loss Factor, 3.0kgm2, 200Hz | | Expansion, % | |
|---|---|---|---|---|
| | Low Bake | High Bake | Low Bake | High Bake |
| CRS | 0.1191 | 0.1394 | 92 | 107 |
| | 0.1078 | 0.1225 | 94 | 103 |
| | 0.1135 | 0.131 | 93 | 105 |

| Substrate | Flexural Strength, (N) | | | |
|---|---|---|---|---|
| | Low Bake | | High Bake | |
| | at 2mm | Max. | at 2mm | Max. |
| 60E | 50 | 154 | 53 | 157 |
| | 51 | 150 | 52 | 154 |
| | 51 | 152 | 53 | 156 |
| CRS | 54 | 166 | 55 | 179 |
| | 51 | 157 | 56 | 174 |
| | 53 | 162 | 56 | 177 |
| AL 6022 | 50 | 179 | 57 | 233 |
| | 51 | 170 | 50 | 222 |
| | 51 | 175 | 54 | 228 |

Flexural Strength (N), min. 150N requirement.
Composite Loss Factor, min. 0.1 requirement
Expansion range 90 - 120 %

Figure 13

High Expandable version (with 7628 type Glass fiber)

Material   High Expandable version (with 7628 type Glass fiber): 130 - 230 % Expansion range

Thickness  1.95 - 2.05 mm patch material thickness alone.

Test       Flexural Strength (N) at RT,
               Acoustic efficiency, Oberst (SAE J 1637, 3.0 kg/m2, 200Hz, composite loss factor)

Substrate  60E(0.75mm), CRS(0.75mm) & AL 6022(0.9mm thickness) (1"x 6" size panel)

Oil        Ferrocote 6130 oil

Bake cycle Low Bake - 171°C/10 min. (Metal temp.)
               High Bake - 205°C/30 min. (Metal temp.)

| Substrate | Composite Loss Factor, 3.0kgm2, 200Hz | | Expansion, % | |
|---|---|---|---|---|
| | Low Bake | High Bake | Low Bake | High Bake |
| CRS | 0.1058 | 0.1129 | 130 | 218 |
| | 0.1061 | 0.1158 | 132 | 195 |
| | 0.106 | 0.1144 | 131 | 206 |

| Substrate | Flexural Strength, (N) | | | |
|---|---|---|---|---|
| | Low Bake | | High Bake | |
| | at 2mm | Max. | at 2mm | Max. |
| 60E | 52 | 156 | 62 | 155 |
| | 52 | 154 | 65 | 152 |
| | 52 | 155 | 64 | 154 |
| CRS | 51 | 182 | 69 | 201 |
| | 54 | 182 | 59 | 177 |
| | 52 | 182 | 64 | 189 |
| AL 6022 | 50 | 161 | 53 | 184 |
| | 50 | 158 | 57 | 188 |
| | 50 | 160 | 55 | 186 |

Flexural Strength (N), min. 150N requirement.
Composite Loss Factor, min. 0.1 requirement
Expansion range 120 - 230 %

Figure 14

EPOXY BASED REINFORCING PATCHES HAVING IMPROVED DAMPING LOSS FACTOR

CROSS-REFERENCE TO RELATED APPLICATIONS

This application is a continuation of U.S. application Ser. No. 16/180,340, entitled "EPOXY BASED REINFORCING PATCHES HAVING IMPROVED DAMPING LOSS FACTOR," filed Nov. 5, 2018, now U.S. Pat. No. 11,339,262, which claims the benefit of U.S. Provisional Application Ser. No. 62/588,620, entitled "EPOXY BASED REINFORCING PATCHES HAVING IMPROVED DAMPING LOSS FACTOR," filed Nov. 20, 2017—which are hereby incorporated herein by reference in their entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to reinforcing patches or sheets having improved damping loss factor, such as, but not limited to, those adapted for applying localized reinforcement to sheet metal, sheet plastic structures, and/or other substrates. More particularly, the present invention is directed to epoxy fiberglass reinforcing patches or sheets that utilize epoxy-modified dimerized fatty acids combined with an epoxy terminated polyurethane interpenetrating network (IPN). The patches of the present invention are suitable for use in both expandable and non-expandable heat curable applications.

2. Background Art

Reinforcing sheets for localized, lightweight reinforcement have been known in the art for years and are the subject of a plurality of patents and/or publications, including: U.S. Pat. No. 4,444,818 entitled "Reinforcing Adhesive Sheets," U.S. Pat. No. 4,766,183 entitled "Thermosetting Composition for an Interpenetrating Polymer Network System," U.S. Pat. No. 4,842,938 entitled "Metal Reinforcing Patch and Method for Reinforcing Metal," U.S. Pat. No. 4,803,105 entitled "Reinforcing Sheet for the Reinforcement of Panel and Method of Reinforcing Panel," U.S. Pat. No. 4,803,108 entitled "Honeycomb Reinforcing Sheet for the Reinforcement of Panels and Method of Reinforcing Panels," U.S. Pat. No. 4,900,601 entitled "Multi-Layer Body Structure for the Reinforcement of a Panel and a Method of Reinforcing a Panel," U.S. Pat. No. 4,929,483 entitled "Method of Reinforcing Sheet Metal Panels, Shaped Plastic Panels or the Like and a Stiffening Member Usable for Performing the Method," U.S. Pat. No. 5,092,947 entitled "Method of Reinforcing Panels," and U.S. Pat. No. 6,586,089 entitled "Epoxy Based Reinforcing Patches with Improved Adhesion to Oily Metal Surfaces,"—all of which are hereby incorporated herein by reference in their entirety including the references cited therein.

Generally, these reinforcing sheets include one or more layers of a stiffening material and one or more layers of a polymeric material that acts as a binder for the stiffening material, as well as an adhesive for securing the reinforcing sheet to a substrate.

U.S. Pat. No. 4,444,818 appears to disclose a thermosetting adhesive sheet that is comprised of a thermosetting resin sheet-shaped prepreg with a reinforcing material embedded therein, and a flattened tubular material provided on one side of the prepeg. The flattened tubular material being capable of nearly recovering the original tubular form on heating and being narrower in width than the prepreg. The prepreg may be of the two-layer structure comprising a first thermosetting resin composition layer and a second thermosetting resin composition layer.

U.S. Pat. Nos. 4,766,183 and 4,842,938 appear to disclose a method for making a one package heat curable (i.e., thermosetting) composition which, on heating, forms a urethane/epoxy/silicone interpenetrating polymer network (IPN) system; one package heat curable compositions made by such a method; metal reinforcing patches, directly adherent to an oily metal surface such as an oily steel surface, comprising a sheet-like carrier having thereon such a one package heat curable composition in combination with a filler admixed therewith, said filler possibly including magnetic particles; a method for reinforcing metal which comprises applying thereto such a metal reinforcing patch and curing said heat curable composition at an elevated temperature to form a urethane/epoxy/silicone interpenetrating polymer network.

U.S. Pat. No. 4,803,105 appears to disclose a reinforcing sheet adaptable to the reinforcement of a panel formed of metal, plastic or sheet molding compound, which reinforcing sheet contains a moisture impermeable barrier embedded in a thermosetting adhesive layer and a reinforcement adhered to the surface of the adhesive layer opposite the surface to be applied to the panel to be reinforced. The reinforcing sheet with improved resistance to the adverse effects of moisture is advantageously used to reinforce cold rolled steel, such as an automobile panel.

U.S. Pat. No. 4,803,108 appears to disclose a reinforcing sheet adaptable to the reinforcement of a panel formed of metal, plastic or sheet molding compound, which reinforcing sheet contains a perforated honeycomb member with a thermosetting adhesive layer on each side of the honeycomb member and a reinforcement backing adhered to one of the adhesive layers, the other adhesive layer being applied to the panel to be reinforced. The reinforcing sheet provides excellent flexural reinforcement and impact absorbing properties and is advantageously used to reinforce cold rolled steel, such as an automobile panel.

U.S. Pat. No. 4,900,601 appears to disclose a multi-layer body member that consists of a support member (e.g., a glass fiber tissue impregnated with a thermosetting resin), which is covered by a layer of thermosetting adhesive resin. In order to protect the sticky surface of the adhesive resin, a protection foil made of a material shrinking under the influence of heat is provided. The foil comprises slits which open to apertures after a preliminary heat treatment such that an essential portion of the sticky resin surface is freely exposed. Thus, the need to remove the protection foil prior to applying the multi-layer body member to the surface to be reinforced is removed.

U.S. Pat. Nos. 4,929,483 and 5,092,947 appear to disclose the method of reinforcing a panel of sheet metal, a shaped plastic body or the like by means of a one- or multi-layer stiffening member of essentially flat shape which comprises a layer at least partially consisting of a thermosetting resin. The stiffening member is subjected to a first heat treatment until at least one of the surfaces of the stiffening member is sticky. Thereafter, the stiffening member is applied to the surface of an element to be reinforced. Finally, the stiffening member is subjected to a second, final heat treatment until all layers comprising a thermosetting resin material are cured. Thus, it is not necessary to manually prepare the stiffening member by removing a protection foil from its sticky surface prior to applying it to the element to be reinforced and a fully automated handling is possible.

U.S. Pat. No. 6,586,089 appears to disclose reinforcing sheets that exhibit improved adhesion to cold and/or oily substrates that have an adhesive layer which contains an epoxy-terminated adduct of an epoxy resin and a rubber that contains a low amount of a nitrile monomer.

While the above-identified references, appear to disclose a plurality of reinforcing patches, none of the above-identified references disclose reinforcing patches having improved damping loss factor as disclosed herein.

It is therefore an object of the present invention to provide new, useful, and nonobvious reinforcing patches having improved damping loss factor for both expandable and non-expandable heat curable applications.

These and other objects of the present invention will become apparent in light of the present specification, claims, and drawings.

SUMMARY OF THE INVENTION

In one embodiment, the present invention is directed to a reinforcing sheet comprising: (a) one or more layers of a reinforcing material; and (b) a thermosetting adhesive associated with at least a portion of the reinforcing material, wherein the thermosetting adhesive includes: (1) a curing agent, and (2) an epoxy-modified dimerized fatty acid combined with an epoxy terminated polyurethane interpenetrating network.

In a preferred embodiment of the present invention, the reinforcing material comprises a woven fabric, such as woven fiberglass. In this embodiment, the woven fiberglass preferably ranges in thickness from approximately 0.25 mm to approximately 5.00 mm, and more preferably ranges in thickness from approximately 0.75 mm to approximately 2.50 mm.

In another preferred embodiment of the present invention, the thermosetting adhesive further comprises microspheres and/or a blowing agent.

In yet another preferred embodiment, the curing agent comprises a boron trifluoride-amine complex, an organic-acid hydrazide, and/or dicyandiamide.

In a preferred embodiment of the present invention, the curing agent is represented by at least one of the following tautomeric chemical structures:

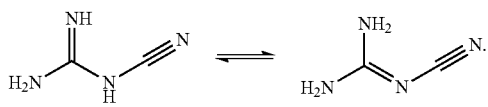

In another preferred embodiment of the present invention, the curing agent is represented by the following chemical structure:

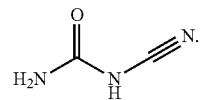

In a preferred embodiment of the present invention, the epoxy-modified dimerized fatty acid is represented by the following chemical structure:

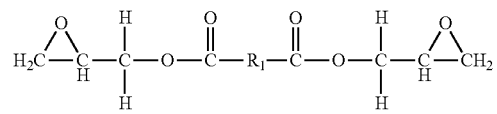

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 40 carbon atoms.

In another preferred embodiment of the present invention, the epoxy-modified dimerized fatty acid is represented by the following chemical structure:

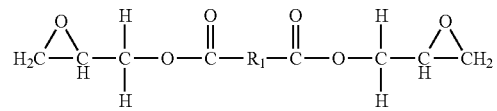

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 35 to approximately 40 carbon atoms.

In yet another preferred embodiment of the present invention, the epoxy-modified dimerized fatty acid is represented by the following chemical structure:

wherein $R_1$ is tall oil based.

In another aspect of the present invention, the epoxy terminated polyurethane interpenetrating network is represented by the following chemical structure:

$$A_1-R_1-A_2$$

wherein $A_1$ is represented by the following chemical structure:

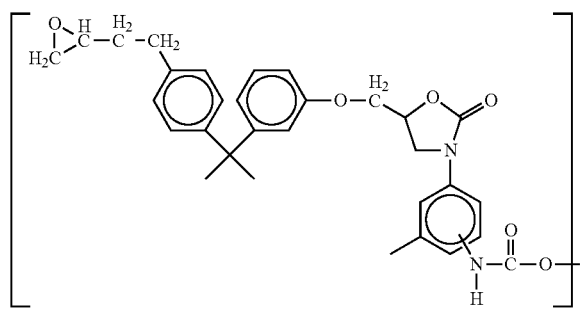

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 75 carbon atoms, an oligomer, and/or a polymer; and wherein $A_2=A_1$ or comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 35 carbon atoms, an oligomer, and/or a polymer.

In a preferred embodiment of the present invention, the epoxy terminated polyurethane interpenetrating network is represented by the following chemical structure:

$$A_1\text{-}R_1\text{-}A_2$$

wherein $A_1$ is represented by the following chemical structure:

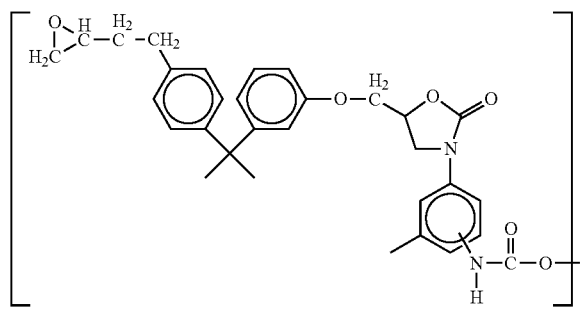

wherein $R_1$ comprises an alkyl, alkenyl, and/or alkynyl group containing approximately 1 to approximately 35 carbon atoms, an oligomer, and/or a urethane polymer; and wherein $A_2=A_1$.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIG. 11 of the drawings is an experiment in accordance with the present invention;

FIG. 12 of the drawings is an experiment in accordance with the present invention;

FIG. 13 of the drawings is an experiment in accordance with the present invention; and FIG. 14 of the drawings is an experiment in accordance with the present invention.

DETAILED DESCRIPTION OF THE INVENTION

Figure 1:
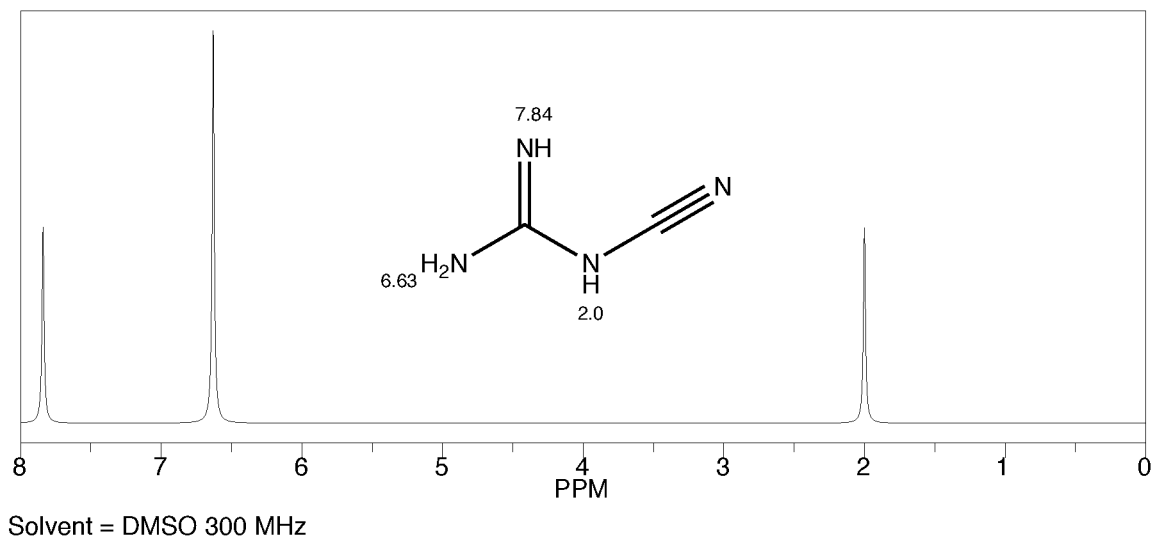
FIG. 1 of the drawings is a $^1$H-NMR spectrogram of a first tautomer of a curing agent.

While this invention is susceptible of embodiment in many different forms, there is shown in the drawings and/or described herein in detail several specific embodiments with the understanding that the present disclosure is to be considered as an exemplification of the principles of the invention and is not intended to limit the invention to the embodiments illustrated.

In accordance with the present invention, surprisingly effective epoxy fiberglass reinforcing patches or sheets that utilize epoxy-modified dimerized fatty acids combined with an epoxy terminated polyurethane interpenetrating network (IPN) are provided herein. The patches of the present invention are suitable for use in both expandable and non-expandable heat curable applications—just to name a few.

The present invention is directed to a reinforcing sheet or patch that includes: (a) one or more layers of a reinforcing material (e.g., woven fabric, woven fiberglass, etcetera) that preferably ranges in thickness from approximately 0.25 mm to approximately 5.00 mm, and more preferably ranges in thickness from approximately 0.75 mm to approximately 1.50 mm; and (b) a thermosetting adhesive associated (e.g., impregnated, etch coated, dip coated, spin coated, brush coated and/or spray coated) with at least a portion of the reinforcing material. Preferably, the thermosetting adhesive includes a curing agent (e.g., aliphatic curing agents, cycloaliphatic curing agents, polyamide curing agents, amidoamine curing agents, waterborne polyamides, latent curatives, tertiary amines, boron trifluoride-amine complexes, hydrazides, organic-acid hydrazides, dicyandiamide, etcetera), and an epoxy-modified dimerized fatty acid combined with an epoxy terminated polyurethane interpenetrating network.

In a preferred embodiment of the present invention, the curing agent is represented by at least one of the following tautomeric chemical structures:

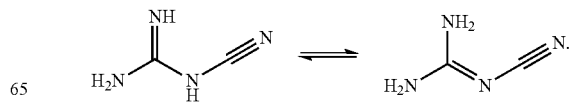

Figure 2:
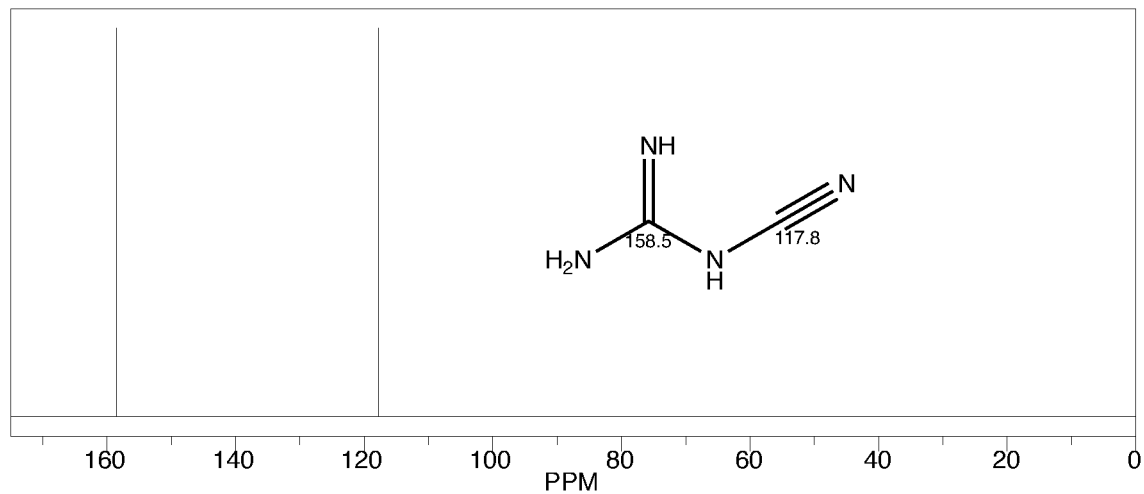
FIG. 2 of the drawings is a $^{13}$C-NMR spectrogram of a first tautomer of a curing agent.
Figure 3:
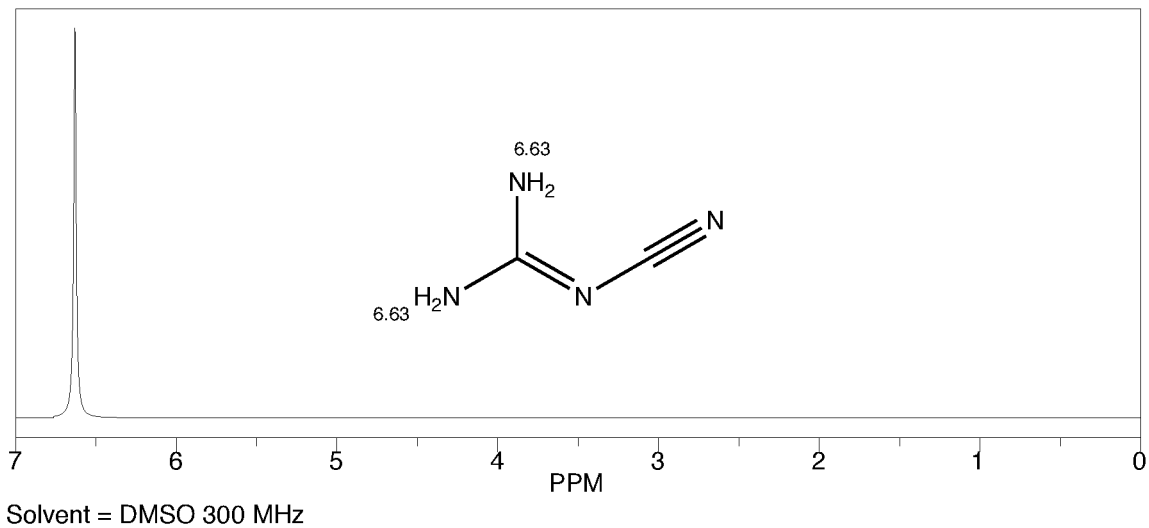
FIG. 3 of the drawings is a $^1$H-NMR spectrogram of a second tautomer of a curing agent.
Figure 4:
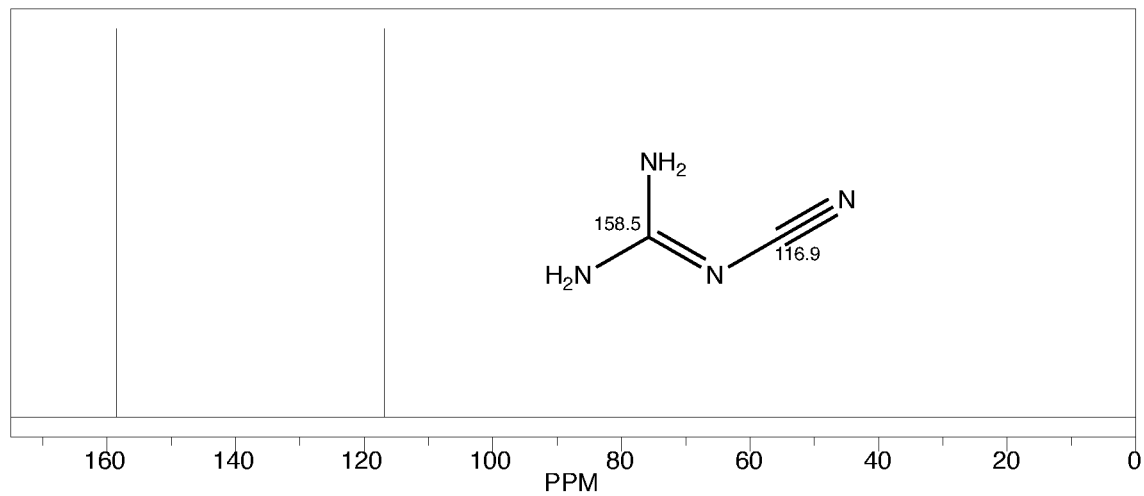
FIG. 4 of the drawings is a $^{13}$C-NMR spectrogram of a second tautomer of a curing agent.

In this embodiment the first tautomer of the curing agent generally comprises the ¹H-NMR spectrogram of FIG. 1 and/or the ¹³C-NMR spectrogram of FIG. 2, and the second tautomer of the curing agent generally comprises the ¹H-NMR spectrogram of FIG. 3 and/or the ¹³C-NMR spectrogram of FIG. 4.

In another preferred embodiment of the present invention, the curing agent is represented by the following chemical structure:

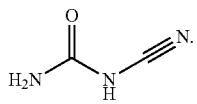

Figure 5:
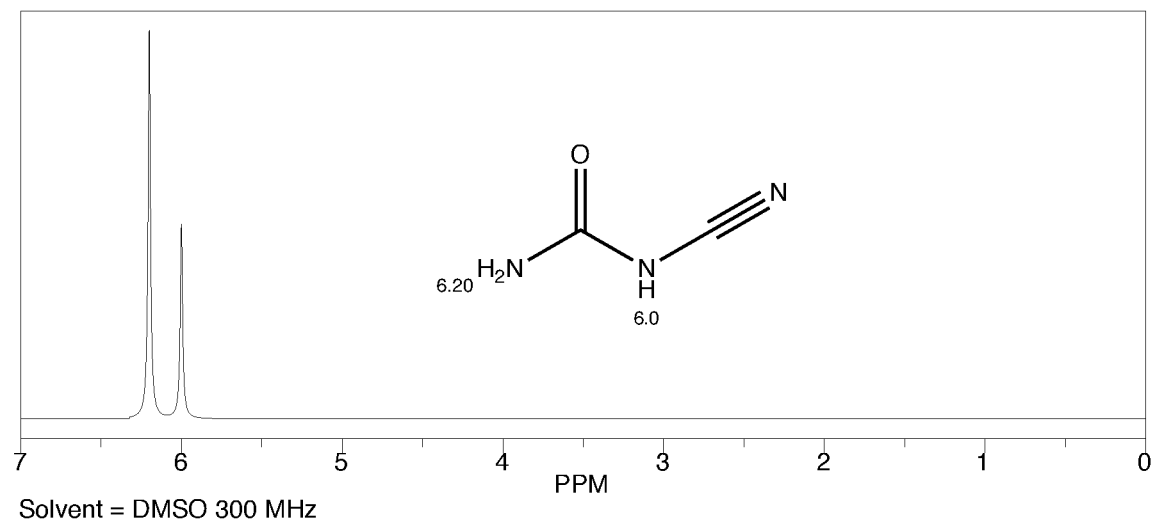
FIG. 5 of the drawings is a $^1$H-NMR spectrogram of a curing agent.
Figure 6:
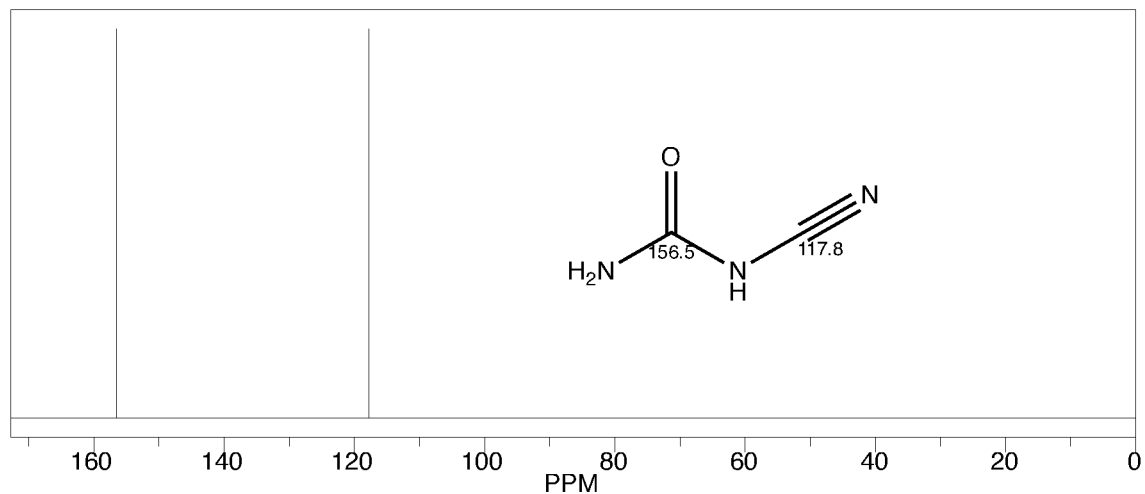
FIG. 6 of the drawings is a $^{13}$C-NMR spectrogram of a curing agent.

In this embodiment the curing agent generally comprises the ¹H-NMR spectrogram of FIG. 5 and/or the ¹³C-NMR spectrogram of FIG. 6.

The above-identified curing agents and/or their precursors, are available from common commercial chemical vendors, such as Sigma-Aldrich Chemical Co., of St. Louis, Mo.

Suitable examples of epoxy-modified dimerized fatty acids include those represented by the following chemical structure:

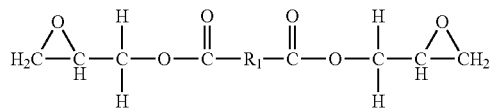

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 40 carbon atoms. In one embodiment, $R_1$ is tall oil based.

In another preferred embodiment of the present invention, the epoxy-modified dimerized fatty acid is represented by the following chemical structure:

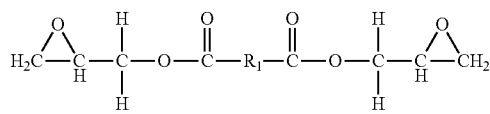

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 35 to approximately 40 carbon atoms.

In yet another preferred embodiment of the present invention, the epoxy-modified dimerized fatty acid is represented by the following chemical structure:

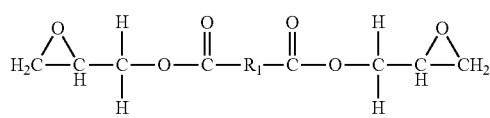

wherein $R_1$ is tall oil based (e.g., C36, $C_{36}H_{72}$, etcetera).

Figure 7:
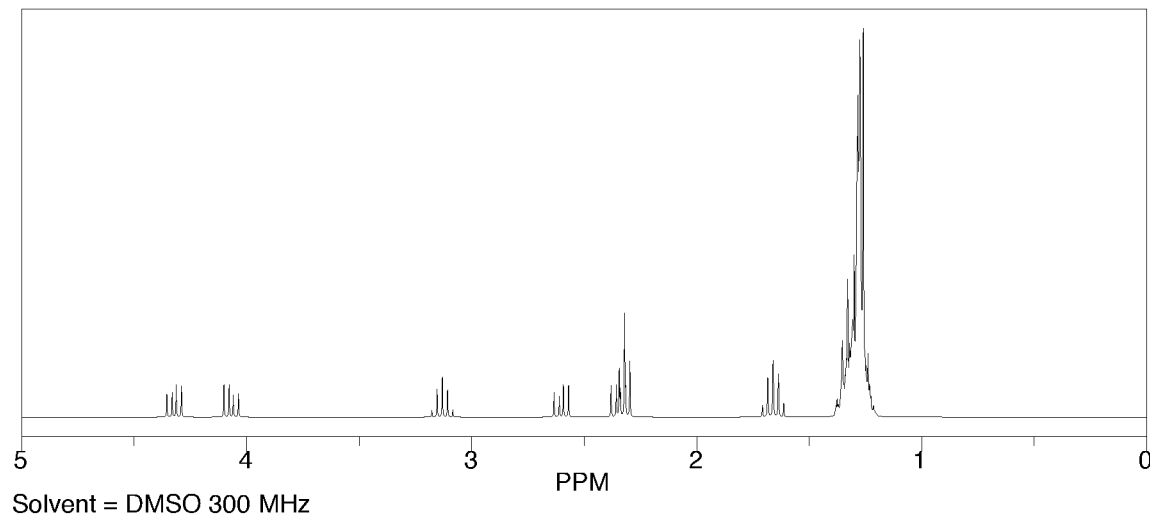
FIG. 7 of the drawings is a $^1$H-NMR spectrogram of an epoxy-modified dimerized fatty acid curing agent.
Figure 8:
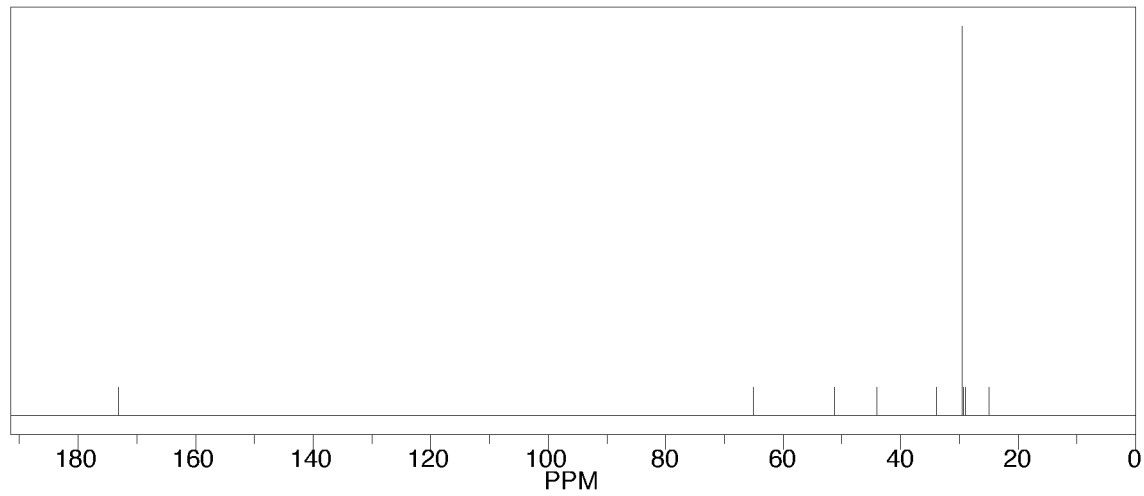
FIG. 8 of the drawings is a $^{13}$C-NMR spectrogram of an epoxy-modified dimerized fatty acid curing agent.

In this embodiment the epoxy-modified dimerized fatty acid curing agent generally comprises the ¹H-NMR spectrogram of FIG. 7 and/or the ¹³C-NMR spectrogram of FIG. 8.

The above-identified epoxy-modified dimerized fatty acid and/or its precursors, are available from common commercial chemical vendors, such as Sigma-Aldrich Chemical Co., of St. Louis, Mo.

In accordance with the present invention, suitable examples of epoxy terminated polyurethane interpenetrating networks include those represented by the following chemical structure:

wherein $A_1$ is represented by the following chemical structure:

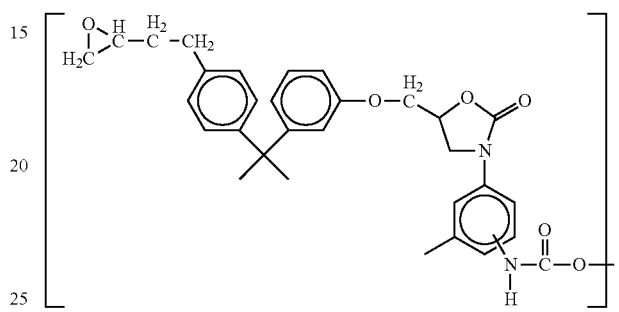

wherein $R_1$ comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 75 carbon atoms, an oligomer, and/or a polymer; and wherein $A_2=A_1$ and/or comprises an alkyl, cycloalkyl, polycycloalkyl, heterocycloalkyl, aryl, alkaryl, aralkyl, alkoxy, alkanoyl, aroyl, alkenyl, alkynyl and/or cyano group containing approximately 1 to approximately 35 carbon atoms, an oligomer, and/or a polymer.

In a preferred embodiment of the present invention, the epoxy terminated polyurethane interpenetrating network is represented by the following chemical structure:

wherein $A_1$ is represented by the following chemical structure:

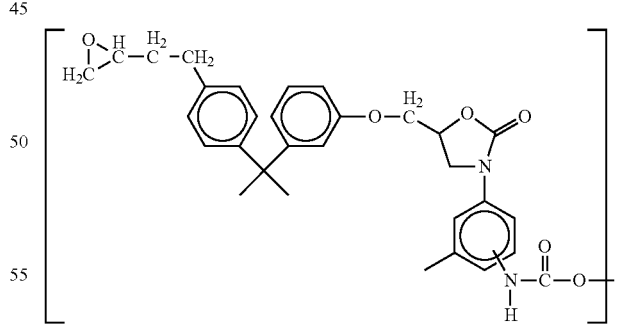

wherein $R_1$ comprises an alkyl, alkenyl, and/or alkynyl group containing approximately 1 to approximately 36 carbon atoms, an oligomer, and/or a urethane polymer; and wherein $A_2=A_1$.

Figure 9:
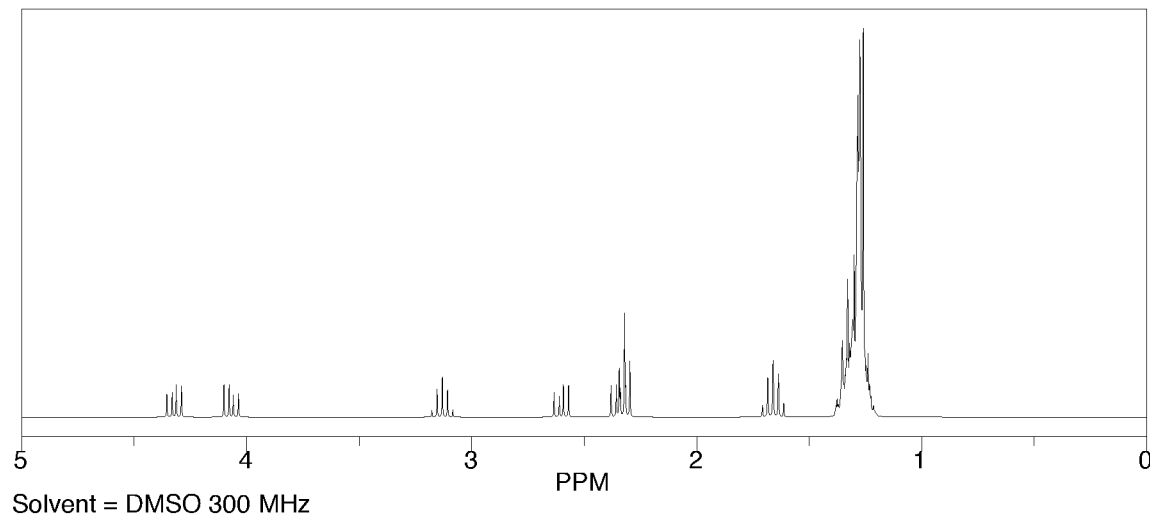
FIG. 9 of the drawings is a $^1$H-NMR spectrogram of an $A_1$ moiety.
Figure 10:
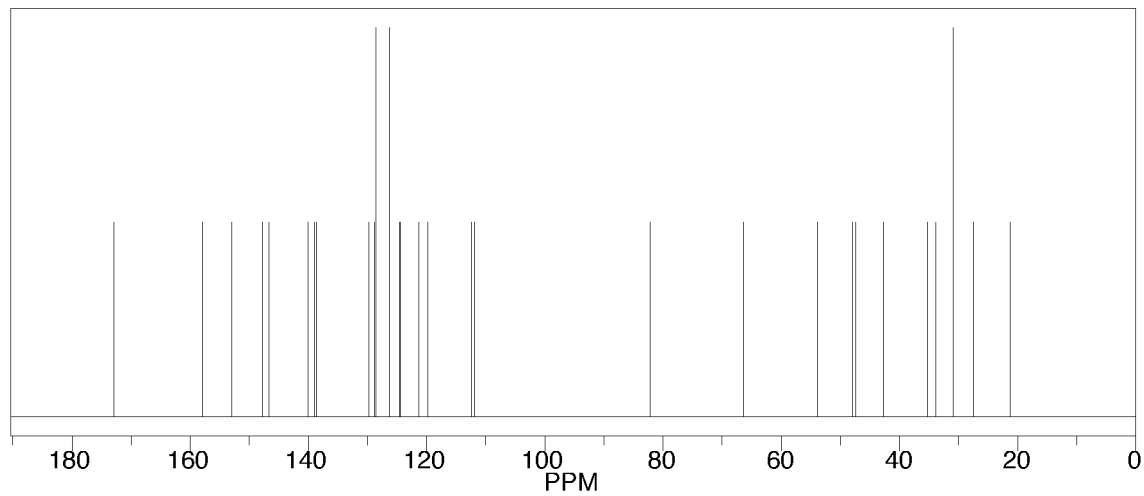
FIG. 10 of the drawings is a $^{13}$C-NMR spectrogram of an $A_1$ moiety.

In this embodiment $A_1$ generally comprises the ¹H-NMR spectrogram of FIG. 9 and/or the ¹³C-NMR spectrogram of FIG. 10.

The above-identified epoxy terminated polyurethane interpenetrating network and/or its precursors, are available from common commercial chemical vendors, such as Sigma-Aldrich Chemical Co., of St. Louis, Mo.

Additional interpenetrating polymer networks are also contemplated for use in accordance with the present invention, including, for example, those disclosed in U.S. Pat. No. 4,766,183 entitled "Thermosetting Composition for an Interpenetrating Polymer Network System," U.S. Pat. No. 4,842,938 entitled "Metal Reinforcing Patch and Method for Reinforcing Metal," U.S. Pat. No. 5,767,187 entitled "Interpenetrating Polymer Network Compositions," U.S. Pat. No. 6,166,127 entitled "Interpenetrating Networks of Polymers," U.S. Pat. No. 7,429,220 entitled "Golf Balls Containing Interpenetrating Polymer Networks," and U.S. Pat. No. 7,790,288 entitled "Interpenetrating Polymer Network as Coating for Metal Substrate and Method Therefor"—which are hereby incorporated herein by reference in their entirety, including all references cited therein.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A reinforcing sheet, comprising:
   at least one layer of a reinforcing material; and
   a thermosetting adhesive associated with at least a portion of the reinforcing material, wherein the thermosetting adhesive includes a curing agent, and an epoxy-modified dimerized fatty acid combined with an epoxy terminated polyurethane interpenetrating network, wherein the curing agent comprises at least one of a boron trifluoride-amine complex, an organic-acid hydrazide, and dicyandiamide.

2. The reinforcing sheet according to claim 1, wherein the reinforcing material comprises a woven fabric.

3. The reinforcing sheet according to claim 2, wherein the reinforcing material comprises woven fiberglass.

4. The reinforcing sheet according to claim 3, wherein the woven fiberglass ranges in thickness from 0.25 mm to 5.00 mm.

5. The reinforcing sheet according to claim 4, wherein the woven fiberglass ranges in thickness from 0.75 mm to 2.50 mm.

6. The reinforcing sheet according to claim 4, wherein the thermosetting adhesive further comprises at least one of microspheres, and a blowing agent.

7. The reinforcing sheet according to claim 1, wherein the epoxy-modified dimerized fatty acid is represented by the following chemical structure:

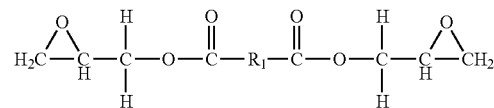

wherein $R_1$ is selected from the group consisting of an alkyl, cycloalkyl, polycycloalkyl, heterocycloalkyl, aryl, alkaryl, aralkyl, alkoxy, alkanoyl, aroyl, alkenyl, alkynyl and cyano group containing 1 to 40 carbon atoms.

8. The reinforcing sheet according to claim 1, wherein the epoxy-modified dimerized fatty acid is represented by the following chemical structure:

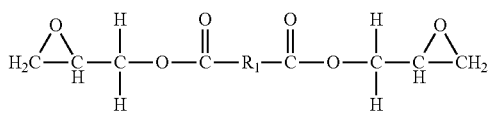

wherein $R_1$ is selected from the group consisting of an alkyl, cycloalkyl, polycycloalkyl, heterocycloalkyl, aryl, alkaryl, aralkyl, alkoxy, alkanoyl, aroyl, alkenyl, alkynyl and cyano group containing 35 to 40 carbon atoms.

9. The reinforcing sheet according to claim 1, wherein the epoxy-modified dimerized fatty acid is represented by the following chemical structure:

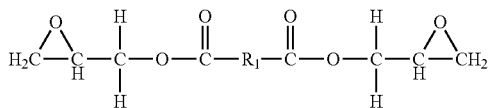

wherein $R_1$ is tall oil based.

10. The reinforcing sheet according to claim 1, wherein the epoxy terminated polyurethane interpenetrating network is represented by the following chemical structure:

$A_1$-$R_1$-$A_2$ wherein $A_1$ is represented by the following chemical structure:

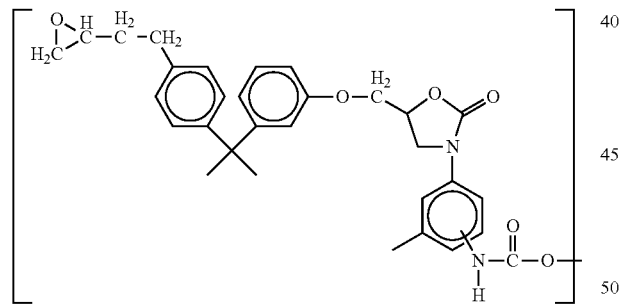

wherein $R_1$ is selected from the group consisting of an alkyl, cycloalkyl, polycycloalkyl, heterocycloalkyl, aryl, alkaryl, aralkyl, alkoxy, alkanoyl, aroyl, alkenyl, alkynyl and cyano group containing 1 to 75 carbon atoms, an oligomer, and/or a polymer; and wherein $A_2$=$A_1$ and/or comprises an alkyl, cycloalkyl, polycycloalkyl, heterocycloalkyl, aryl, alkaryl, aralkyl, alkoxy, alkanoyl, aroyl, alkenyl, alkynyl and cyano group containing 1 to 35 carbon atoms, an oligomer, and/or a polymer.

11. The reinforcing sheet according to claim 1, wherein the epoxy terminated polyurethane interpenetrating network is represented by the following chemical structure:

$A_1$-$R_1$-$A_2$ wherein $A_1$ is represented by the following chemical structure:

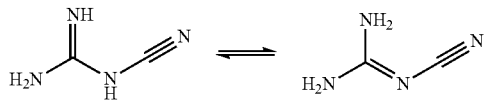

wherein $R_1$ is selected from the group consisting of an alkyl, alkenyl, and alkynyl group containing 1 to 36 carbon atoms, an oligomer, and/or a urethane polymer; and wherein $A_2$=$A_1$.

12. A reinforcing sheet, comprising:
 at least one layer of a reinforcing material, wherein the reinforcing material comprises woven fiberglass, and wherein the woven fiberglass ranges in thickness from 0.75 mm to 2.50 mm;
 a thermosetting adhesive associated with at least a portion of the reinforcing material, wherein the thermosetting adhesive includes a curing agent, and an epoxy-modified dimerized fatty acid combined with an epoxy terminated polyurethane interpenetrating network;
 wherein the curing agent is represented by at least one of the following tautomeric chemical structures:

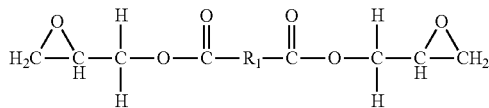

wherein the epoxy-modified dimerized fatty acid is represented by the following chemical structure:

wherein $R_1$ is selected from the group consisting of an alkyl, cycloalkyl, polycycloalkyl, heterocycloalkyl, aryl, alkaryl, aralkyl, alkoxy, alkanoyl, aroyl, alkenyl, alkynyl and cyano group containing 35 to 40 carbon atoms; and wherein the epoxy terminated polyurethane interpenetrating network is represented by the following chemical structure:

$A_1$-$R_1$-$A_2$ wherein $A_1$ is represented by the following chemical structure:

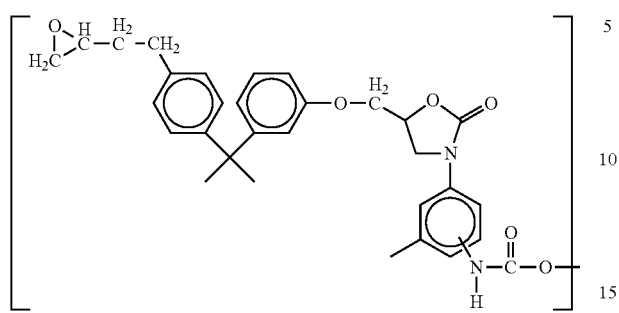

wherein $R_1$ is selected from the group consisting of an alkyl, alkenyl, and/or alkynyl group containing 1 to 36 carbon atoms, an oligomer, and a urethane polymer; and wherein $A_2=A_1$.

13. The reinforcing sheet according to claim 12, wherein the thermosetting adhesive further comprises at least one of microspheres, and a blowing agent.

14. A reinforcing sheet, comprising:
at least one layer of a reinforcing material; and
a thermosetting adhesive associated with at least a portion of the reinforcing material, wherein the thermosetting adhesive includes a curing agent, and an epoxy-modified dimerized fatty acid combined with an epoxy terminated polyurethane interpenetrating network, wherein the curing agent is represented by at least one of the following tautomeric chemical structures:

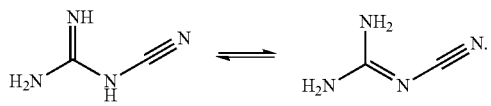 [SMILES: N#CNC(=N)N ; N#CN=C(N)N]

* * * * *